United States Patent
Wu et al.

(10) Patent No.: US 10,081,753 B2
(45) Date of Patent: *Sep. 25, 2018

(54) OIL-PHASE-FREE TRIPLE-PLAY SLICK WATER CONCENTRATION SYSTEM WITH EFFECTS OF SYNERGISTICALLY REDUCING DRAG, ASSISTING DRAINAGE AND PROMOTING CLAY STABILIZATION

(71) Applicant: Yangtze University, Jingzhou (CN)

(72) Inventors: Jun Wu, Houston, TX (US); Wei-Chu Yu, Jingzhou (CN)

(73) Assignee: YANGTZE UNIVERSITY, Jingzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,735

(22) Filed: Oct. 24, 2017

(65) Prior Publication Data

US 2018/0112118 A1    Apr. 26, 2018

(30) Foreign Application Priority Data

Oct. 25, 2016    (CN) .......................... 2016 1 0938639

(51) Int. Cl.
| | |
|---|---|
| *C09K 8/05* | (2006.01) |
| *B01F 17/00* | (2006.01) |
| *C09K 8/584* | (2006.01) |
| *C09K 8/88* | (2006.01) |
| *C11D 1/00* | (2006.01) |
| *C08F 2/06* | (2006.01) |

(52) U.S. Cl.
CPC ............. *C09K 8/05* (2013.01); *B01F 17/0035* (2013.01); *C08F 2/06* (2013.01); *C09K 8/584* (2013.01); *C09K 8/882* (2013.01); *C11D 1/004* (2013.01); *C09K 2208/12* (2013.01); *C09K 2208/28* (2013.01)

(58) Field of Classification Search
CPC ........ B01F 17/0035; C08F 2/06; C09K 8/584; C09K 8/882; C09K 2208/12; C09K 2208/28
See application file for complete search history.

(56) References Cited

U.S. PATENT DOCUMENTS

2009/0221453 A1*    9/2009  Mukhopadhyay ....... C09K 8/68
                                                                507/202

\* cited by examiner

*Primary Examiner* — Zakiya W Bates
*Assistant Examiner* — Crystal J Miller
(74) *Attorney, Agent, or Firm* — Hemisphere Law, PLLC; Zhigang Ma

(57) ABSTRACT

An oil-phase-free triple-play slick water concentration system, is characterized by first synthesizing a water-soluble dispersion polymer drag reducer A; and then preparing an inorganic salt solution B, under mechanical agitation, of high-performance water-soluble fluorocarbon surfactant and a water-soluble of high-performance small molecule or macromolecule clay stabilizer containing quaternary ammonium ions; and finally, the aqueous inorganic salt solution B is slowly added to the drag reducer dispersion A, wherein the ratio of the aqueous inorganic salt solution B and the dispersion A is 20-80:80-20.

9 Claims, No Drawings

OIL-PHASE-FREE TRIPLE-PLAY SLICK WATER CONCENTRATION SYSTEM WITH EFFECTS OF SYNERGISTICALLY REDUCING DRAG, ASSISTING DRAINAGE AND PROMOTING CLAY STABILIZATION

BACKGROUND OF THE INVENTION

1. Field of the Invention

The present invention relates to an oil-phase-free triple-play slick water concentration solution, especially relates to an oil-phase-free triple-play slick water concentration solution with synergistic performances by drag reducer, flow back surfactant and clay stabilizer.

2. Description of Related Arts

With the extensive shale oil and gas exploration and development, slick water fracturing with the aim to improve reservoir permeability, receives more and more attention. Slick water refers to a fluid where small amounts of drag reducing agent, flow back surfactant and clay stabilizer etc., are added to fresh or saline water before it is pumped downhole for fracking. During fracking, the high-pressure fluid quickly penetrate reservoir to enhance its permeability or conductivity with increased hydrocarbon recovery being the result.

Pluralities of various classes of chemical agents such as drag reducer, clay stabilizer, flow back surfactant and biocide may differ in physical state such as solid or liquid and vary in chemical reactivity. Thus, they are normally packed under various forms prior to being transported to the fracking well site. Liquids are often stored in tanks, whereas solids are required to be sheltered in designated area with appropriate fire-proof and rain-proof measures. These chemicals are to be commingled through multiple pipelines and special blending device, before the resultant slick water could be pumped downhole for fracking.

Shale oil and gas fields are often in locations such as mountainous areas with poor communications, limited space and accessibility. Therefore, the storage and handling of various chemical agents simultaneously compel many problems: 1) it is not convenient and economical to ship a variety of chemicals to mountainous area; increased transportation costs and risks are the result; 2) multiple tanks or specialized storage areas for potentially incompatible chemicals increase logistical cost and operation risk; 3) the use of a plurality of pipes, pressure manifolds for blending and pumping multiple agents dictates substantial manpower and resources, greatly increasing HSE risk to personnel and operational errors. Therefore, the development of a simplified, synergistic all-in-one slick water concentrate with coexistent functions of drag reduction, drainage enhancement and clay stabilization, to minimize transportation, storage costs, and to mitigate personnel HSE risks and operation errors, is a common endeavor and direction by those professionals working in slick water fracturing.

SUMMARY OF THE INVENTION

An Oil-phase-free triple-play slick water concentration solution, is characterized by first synthesizing a water-soluble dispersion polymer drag reducer A; and then preparing an inorganic salt solution B, under mechanical agitation, of high-performance water-soluble fluorocarbon surfactant and a water-soluble of high-performance small molecule or macromolecule clay stabilizer containing quaternary ammonium ions; and finally, the aqueous inorganic salt solution B is slowly added to the drag reducer dispersion A, wherein the ratio of aqueous inorganic salt solution B and the dispersion A is 20-80: 80-20; wherein the dispersion polymer drag reducer A is prepared from dispersion polymerization at elevated temperature with a water-soluble monomer A1, a water-soluble dispersing agent A2, a water-soluble free radical initiator A3, inorganic salt A4, and water A5; wherein weight ration of each component in dispersion polymer drag reducer A is: water-soluble monomer A1: 5.0-20.0%; water-soluble dispersant A2: 0.1-5.00/%; water-soluble radical initiator A3: 0.000001-0.100%; inorganic salt A4 15.0-40.0%; water A5: remainder; wherein the aqueous inorganic salt solution B is formulated with fluorocarbon surfactant B1, water-soluble cationic quaternary ammonium clay stabilizer B2, inorganic salt B3 and water B4; wherein weight ration of each component in the aqueous inorganic salt solution B is: water-soluble fluorocarbon surfactant B1: 0.01-10.0%; water-soluble quaternary ammonium cationic clay stabilizer B2: 0.1-20.0%; inorganic salt B3: 10.0-50.0%; water B4: remainder.

The present invention is advantageous in that synergies and multiple properties including drag reduction, water flow back and clay stabilization coexist in one concentration solution. The extent of drag reduction can reach over 70% during hydraulic fracturing. Meanwhile, the introduction of fluorocarbon surfactant and quaternary ammonium clay stabilizer creates synergies with the surface tension as low as below 30 mN/m, the interfacial tension being 0.1 mN/m or less, and clay-swelling prevention of greater than 70%. As a slick water concentrate, it requires only a tank, a pipeline and a pump during on-site operation by dosing 0.01 to 1.0% of the concentrate to fresh or saline water.

DETAILED DESCRIPTION OF THE INVENTION

The following specific examples in conjunction with the present invention will be further described below, for the preparation of 200.0 kg oil-phase-free triple-play slick water concentration solution with effects of synergistically reducing drag, assisting drainage and promoting clay stabilization (dispersion polymer drag reducer A: 100.0 kg; aqueous inorganic salt solution B: 100.0 kg).

The concentration solution is realized by first preparing a "water-in-water" dispersion drag reducer A of synthetic water-soluble polymer in inorganic salt via dispersion polymerization. Then an aqueous inorganic salt solution B is formulated by dissolving small amounts of high-performance water-soluble fluorocarbon surfactant and high-performance water-soluble small molecules or macromolecules clay stabilizer containing quaternary ammonium ions into inorganic salt solution. Under mechanical stirring, the homogeneous aqueous inorganic salt solution B is slowly added to the dispersion drag reducer A, to generate the triple-play slick water concentrate with the properties of drag reducer, flow back surfactant and clay stabilizer. "Water-in-water" dispersion polymer-based drag reducer A may be an ordinary water-soluble polymer drag reducing agent or it may be a water-soluble low-damaging polymer drag reducer modified with hydrophobic or fluorocarbon moieties for reduced friction coefficients between drag reducer macromolecules and among their interactions with the reservoir.

The oil-phase-free triple-play slick water concentration solution with the effects of reducing drag, assisting drainage and promoting clay stabilization, is characterized by: first synthesizing a water-soluble polymeric drag reducer in an aqueous inorganic salt solution via dispersion polymerization to obtain dispersion polymer drag reducer A; and then preparing an aqueous inorganic salt solution B, under mechanical agitation, of high-performance water-soluble fluorocarbon surfactant and water-soluble of high-performance small molecule or macromolecule clay stabilizer containing quaternary ammonium ions; and finally, the aqueous inorganic salt solution B is slowly added to the drag reducer dispersion A, wherein the ratio between aqueous inorganic salt solution B and the dispersion polymer drag reducer A is 20-80: 80-20.

The dispersion polymer drag reducer A is obtained by first dissolving water-soluble monomer A1, water-soluble dispersing agent A2, water-soluble radical initiator A3, inorganic salt A4 into water A5 to form a homogeneous solution. The homogenous solution is then heated at elevated temperature to initiate dispersion polymerization to generate dispersion drag reducer A. The percentages of each components, relative to the total weight of the dispersion polymer drag reducer A are the following: water-soluble monomer A1: 5.0-20.0%; water-soluble dispersant A2: 0.1-5.0%; water-soluble radical initiator A3: 0.000001-0.100%; inorganic salts A4: 15.0-40.0%; water A5: remainder.

The inorganic salt solution B is formulated by dissolving fluorocarbon surfactant B1, cationic water-soluble quaternary ammonium clay stabilizer B2, inorganic salt B3 into water B4. The percentage of each component based on the total weight of the aqueous inorganic salt solution B is: water-soluble fluorocarbon surfactant B1: 0.01-10.0%; water-soluble quaternary ammonium cationic day stabilizer B2: 0.1-20.0%; inorganic salts B3: 10.0-50.0%; water B4: remainder.

The water-soluble monomer A1 is selected from one or more of the group consisting of hydroxyethyl acrylate, hydroxyethyl methacrylate, hydroxypropyl acrylate, hydroxypropyl methacrylate, ethoxylated-2-hydroxyethyl acrylate, ethoxylated-2-hydroxyethyl methacrylate, hydroxymethyl styrene, vinyl acetate, acrylamide, dimethyldiallyl ammonium chloride, [2-(methacryloyloxy)ethyl]trimethylammonium chloride, [2-(acryloyloxy)ethyl]trimethylammonium chloride; (3-acrylamidopropyl)trimethylammonium chloride, [3-(methacryloylamino)propyl]trimethylammonium chloride, acryloxyethyldimethylbenzyl ammonium chloride, methacryloxyethyldimethylbenzyl ammonium chloride, acrylic acid, sodium acrylate, potassium acrylate, methacrylic acid, sodium methacrylate, potassium methacrylate, 2-acrylamido-2-methylpropanesulfonic acid, 2-acrylamido-2-methylpropane sulfonate sodium salt, and 2-acrylamido-2-methyl propane sulfonic acid potassium salt.

The water-soluble dispersant A2 is one or more of the dispersants selected from water-soluble dispersant including poly {[2-(methacryoyloxy)ethyl]trimethylammonium chloride}, poly {[2-(acryloyloxy)ethyl]trimethylammonium chloride}, polyvinyl benzyl trimethyl ammonium chloride), poly(dimethyl diallyl ammonium chloride), hydrolyzed polyacrylamide and hydrolyzed polyvinyl acetate.

The water-soluble free radical initiator A3 is one or more of initiators selected from the group consisting of water-soluble initiators including ammonium persulfate, sodium persulfate, potassium persulfate, hydrogen peroxide, 2,2'-azobisisobutylamidine dihydrochloride, 2,2'-azo[2-(2-imidazolin-2-yl) propane] dihydrochloride, and 4,4'-azobis(4-cyanovaleric acid).

The inorganic salt A4 is one or more of the inorganic salts selected from the group consisting of sodium chloride, ammonium chloride, ammonium bicarbonate, ammonium carbonate, ammonium sulfate, potassium chloride, sodium sulfate, aluminum tribromide, aluminum trichloride, aluminum nitrate, aluminum sulfate, potassium aluminum sulfate, ammonium chromate, ammonium chlorate, ammonium nitrate, ammonium sulfamate, ammonium sulfide, ammonium sulfite, ammonium perchlorate, barium nitrate, barium oxalate, cesium chloride, cesium chromate, calcium chloride, calcium chromate, calcium oxalate, copper nitrate, copper sulfate, ferrous chloride, ferric chloride, lithium bromide, lithium carbonate, lithium chloride, lithium hypochlorite, lithium chlorate, lithium perchlorate, lithium iodide, lithium nitrate, lithium sulfide, lithium sulfite, lithium sulfate, magnesium chloride, magnesium perchlorate, magnesium sulfate, manganese dichloride, manganese trichloride, potassium bromide, potassium bicarbonate, potassium bisulfite, potassium carbonate, potassium chlorate, potassium iodide, potassium nitrate, potassium iodate, potassium permanganate, potassium sulfate, potassium sulfite, potassium sulfide, rubidium bromide, rubidium chloride, rubidium iodide, rubidium nitrate, silver nitrate, sodium bicarbonate, sodium bisulfite, sodium borate, sodium borohydride, sodium bromide, sodium bromate, sodium carbonate, sodium chlorate, sodium chlorite, sodium sulfite, sodium hydrosulfide, sodium hypochlorite, sodium hypophosphite, sodium nitrate, sodium nitrite, sodium perchlorate, sodium periodate, sodium permanganate, sodium sulfide, strontium carbonate, strontium chloride, strontium nitrate, strontium titanate, stannous chloride, stannic chloride, vanadium chloride, zinc bromide, zinc carbonate, zinc chloride, zinc iodide, zinc sulfate, and zinc sulfide.

The fluorocarbon monomer B1 is one or more of the fluorocarbon monomers selected from the group of fluorocarbon monomers including pentafluorophenyl acrylate, 1,1,1,3,3,3-hexafluoro isopropyl acrylate, 1H,1H,3H-hexafluorobutyl acrylate, 2,2,2-trifluoroethyl acrylate, and perfluorodecyl acrylate.

The quaternary ammonium salt B2 is one or more of the quaternary ammonium salts selected from the group consisting of water-soluble quaternary ammonium salt including tetramethylammonium chloride, choline chloride, butyl trimethylammonium chloride, octyl trimethyl ammonium chloride, dodecyl trimethyl ammonium chloride, cetyl trimethyl ammonium chloride, and poly(dimethyl diallyl ammonium chloride).

The inorganic salt B3 is one or more of the inorganic salts selected from the group consisting of sodium chloride, ammonium chloride, ammonium bicarbonate, ammonium carbonate, ammonium sulfate, potassium chloride, sodium sulfate, aluminum tribromide, aluminum trichloride, aluminum nitrate, aluminum sulfate, potassium aluminum sulfate, ammonium chromate, ammonium chlorate, ammonium nitrate, ammonium sulfamate, ammonium sulfide, ammonium sulfite, ammonium perchlorate, barium nitrate, barium oxalate, cesium chloride, cesium chromate, calcium chloride, calcium chromate, calcium oxalate, copper nitrate, copper sulfate, ferrous chloride, ferric chloride, lithium bromide, lithium carbonate, lithium chloride, lithium hypochlorite, lithium chlorate, lithium perchlorate, lithium iodide, lithium nitrate, lithium sulfide, lithium sulfite, lithium sulfate, magnesium chloride, magnesium perchlorate, magnesium sulfate, manganese dichloride, manganese trichloride, potassium bromide, potassium bicarbonate, potassium bisulfite, potassium carbonate, potassium chlorate, potassium iodide, potassium nitrate, potassium iodate, potassium permanganate, potassium sulfate, potassium sulfite, potassium sulfide, rubidium bromide, rubidium chloride, rubidium iodide, rubidium nitrate, silver nitrate, sodium bicarbonate, sodium bisulfite, sodium borate, sodium borohydride, sodium bromide, sodium bromate, sodium carbonate, sodium chlorate, sodium chlorite, sodium sulfite, sodium hydrosulfide, sodium hypochlorite, sodium hypophosphite, sodium nitrate, sodium nitrite, sodium perchlorate, sodium periodate, sodium permanganate, sodium sulfide, strontium carbonate, strontium chloride, strontium nitrate, strontium titanate, stannous chloride, stannic chloride, vanadium chloride, zinc bromide, zinc carbonate, zinc chloride, zinc iodide, zinc sulfate, and zinc sulfide.

The above-described drag reducing agent is prepared by using water-soluble monomers exclusively. Further, the drag reducing agents may be water-soluble macromolecules modified with hydrophobic or fluorocarbon moieties. Based on the technical solutions described above, mutual solvent A6 and hydrophobic monomer A7, or mutual solvent A6 and fluorinated monomer A8, can be introduced to the original homogenous aqueous solution, before the subsequent dispersion polymerization takes place at elevated temperature under mechanical agitation. Thus, the resultant polymer chains possess hydrophobic or fluorocarbon moieties on its backbone to minimize intermolecular and molecular-reservoir friction coefficient.

The mutual solvent A6 is one or more of the mutual solvents selected from the group consisting of mutual solvents including ethylene glycol monobutyl ether, dimethyl formamide, and alcohol derivatives, aldehyde derivatives, ketone derivatives, ether derivatives and other derivatives of dimethyl sulfoxide;

The hydrophobic monomer A7 is one or more of hydrophobic monomers selected from the group of hydrophobic monomers comprising methyl acrylate, methyl methacrylate, ethyl acrylate, ethyl methacrylate, propyl acrylate, propyl methacrylate, butyl acrylate, butyl methacrylate, and styrene;

The fluorocarbon monomer A8 is one or more of the fluorocarbon monomers selected from the group of fluorocarbon monomers including pentafluorophenyl acrylate, 1,1,1,3,3,3-hexafluoro isopropyl acrylate, 1H,1H,3H-hexafluorobutyl acrylate, 2,2,2-trifluoroethyl acrylate, and perfluorodecyl acrylate.

Example 1

For the preparation of 100.0 kg dispersion polymer drag reducer A, the weights of water-soluble monomer A1, water-soluble dispersant A2, water-soluble radical initiator A3, inorganic salt A4, and water A5 are as the following: water-soluble monomers A1: sodium acrylate, 3.0 kg and acrylamide, 4.0 kg; water-soluble dispersant A2: hydrolyzed polyvinyl acetate, 2.0 kg; water-soluble radical initiator A3: ammonium persulfate, 0.0010 kg; inorganic salt A4: sodium chloride, 10.0 kg; ammonium chloride, 5.0 kg; ammonium sulfate, 10.0 kg; water A5: water, 65.999 kg.

The above-mentioned water-soluble monomer A1, water-soluble dispersing agent A2, water-soluble free radical initiator A3, inorganic salt A4 and water A5 are first dissolved to form a homogeneous solution under mechanical stirring. The solution is then allowed to warm to 60-80° C. to initiate dispersion polymerization to generate 100.0 kg "water-in-water" dispersion polymer drag reducer.

For the preparation of 100.0 kg B, the weights of each component are as the following: fluorocarbon surfactants B1: sodium perfluorooctanoate, 1.0 kg; clay stabilizer B2: choline chloride, 20.0 kg; inorganic salt B3: ammonium chloride, 15.0 kg; ammonium sulfate, 15.0 kg; water B4: water, 49.0 kg. Fluorocarbon surfactant B1, clay stabilizer B2, inorganic B3, water B4 are dissolved together to generate the solution B under mechanical stirring.

After the preparation of dispersion polymer drag reducer A and the aqueous inorganic salt solution B, the aqueous inorganic salt solution B is slowly added dropwise to dispersion A under mechanical stirring for 1 hour to generate a triple-play slick water concentrate 200.0 kg.

Example 2

For the preparation of 100.0 kg dispersion polymer drag reducer A, the weights of water-soluble monomer A1, water-soluble dispersant A2, water-soluble radical initiator A3, inorganic salt A4, mutual solvent A6, fluorocarbon monomer A7, water A5, are as the following: water-soluble monomers A1: sodium acrylate, 3.0 kg; acrylamide, 3.0 kg; water-soluble dispersant A2: hydrolyzed polyacrylamide, 2.0 kg; water-soluble radical initiator A3: ammonium persulfate, 0.0010 kg; inorganic salt A1: sodium chloride, 10.0 kg; ammonium chloride, 5.0 kg; ammonium sulfate, 10.0 kg; mutual solvent A6: ethylene glycol monobutyl ether, 10.0 kg; hydrophobic monomer A7: methyl acrylate, 1.0 kg; Water A5: water, 55.999 kg.

The above-mentioned water-soluble monomers A1, water-soluble dispersing agent A2, water-soluble free radical initiator A3, inorganic salt A4, mutual solvent A6, hydrophobic monomer A7 and water A5 are first dissolved to form a homogeneous solution under mechanical stirring. The solution is then allowed to warm to 60-80° C. to initiate dispersion polymerization to generate 100.0 kg "water-in-water" dispersion polymer drag reducer.

For the preparation of 100.0 kg B, the weights of each component are as the following: fluorocarbon surfactants B1: sodium perfluorooctanoate, 1.0 kg; clay stabilizer B2: choline chloride, 20.0 kg; inorganic B3: ammonium chloride, 15.0 kg; ammonium sulfate, 15.0 kg; water B4: water, 49.0 kg.

Fluorocarbon surfactant B1, clay stabilizer B2, inorganic B3, water B4 are dissolved together to generate the solution B under mechanical stirring. After the preparation of dispersion polymer drag reducer A, the aqueous inorganic salt solution B is slowly added dropwise to dispersion A under mechanical stirring for 1 hour to generate a triple-play slick water concentrate 200.0 kg.

Example 3

For the preparation of 100.0 kg dispersion polymer drag reducer A, the weights of water-soluble monomer A1, water-soluble dispersant A2, water-soluble radical initiator A3, inorganic salt A5, water A5, are as the following: water-soluble monomers A1: sodium acrylate, 3.0 kg; acrylamide, 3.9 kg; water-soluble dispersant A2: hydrolyzed poly(vinyl acetate), 2.0 kg; water-soluble radical initiator A3: ammonium persulfate, 0.0010 kg; inorganic A4: sodium chloride, 10.0 kg; ammonium chloride, 5.0 kg; ammonium sulfate, 10.0 kg; mutual solvent A6: ethylene glycol monobutyl ether, 10.0 kg; fluorocarbon monomer A8: perfluorodecyl acrylate, 0.10 kg; water A5: water, 55.999 kg.

The above-mentioned water-soluble monomers A1, water-soluble dispersing agent A2, water-soluble free radical initiator A3, inorganic salt A4, mutual solvents A6, fluorocarbon monomer A7 and water A5 are first homogenized under rapid mechanical stirring to generate a homogeneous solution. The solution is then warmed to 60-80° C. to initiate dispersion polymerization to generate dispersion polymer drag reducer A 100.0 kg.

For the preparation of 100.0 kg B, the weights of each component are as the following: fluorocarbon surfactants B1: sodium perfluorooctanoate, 1.0 kg; clay stabilizer 132: choline chloride, 20.0 kg; inorganic salt B3: ammonium chloride, 15.0 kg; ammonium sulfate, 15.0 kg; water B4: water, 49.0 kg. Fluorocarbon surfactant B1, clay stabilizer B2, inorganic B3, water B4 are homogenized under mechanical stirring to generate B 100.0 kg.

After the preparation of dispersion polymer drag reducer A and the aqueous inorganic salt solution B, the aqueous inorganic salt solution B is slowly added dropwise to dispersion A under mechanical stirring for 1 hour to generate a triple-play slick water concentrate 200.0 kg.

The present invention is advantageous in that synergies and multiple properties including drag reduction, water flow back and clay stabilization coexist in one concentration solution. The extent of drag reduction can reach over 70% during hydraulic fracturing. Meanwhile, the introduction of fluorocarbon surfactant and quaternary ammonium clay stabilizer creates synergies with the surface tension as low as below 30 mN/m, the interfacial tension being 0.1 mN/m or less, and clay-swelling prevention of greater than 70%. As a slick water concentrate, it requires only a tank, a pipeline and a pump during on-site operation by dosing 0.01 to 1.0% of the concentrate to fresh or saline water.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An oil-phase-free triple-play slick water concentration solution, characterized by first synthesizing a water-soluble dispersion polymer drag reducer A; and then preparing an inorganic salt solution B, under mechanical agitation, of a high-performance water-soluble fluorocarbon surfactant and a water-soluble of high-performance small molecule or macromolecule clay stabilizer containing quaternary ammonium ions; and finally, the aqueous inorganic salt solution B slowly added to the drag reducer dispersion A, wherein the ratio of aqueous inorganic salt solution B and the dispersion polymer drag reducer A is 20-80: 80-20;
wherein the dispersion polymer drag reducer A is prepared from dispersion polymerization at elevated temperature with a water-soluble monomer A1, a water-soluble dispersing agent A2, a water-soluble free radical initiator A3, an inorganic salt A4, and water A5; wherein the weight ratio of each component in the dispersion polymer drag reducer A is: water-soluble monomer A1: 5.0-20.0%; water-soluble dispersant A2: 0.1-5.0%; water-soluble radical initiator A3: 0.000001-0.100%; inorganic salt A4 15.0-40.0%; water A5: remainder;
wherein the aqueous inorganic salt solution B is formulated with a fluorocarbon surfactant B1, a water-soluble cationic quaternary ammonium clay stabilizer B2, an inorganic salt B3, and water B4; wherein the weight ratio of each component in the aqueous inorganic salt solution B is: the water-soluble fluorocarbon surfactant B1: 0.01-10.0%; the water-soluble quaternary ammonium cationic clay stabilizer B2: 0.1-20.0%; the inorganic salt B3: 10.0-50.0%; and water B4: remainder.

2. The oil-phase-free triple-play slick water concentration solution as described in claim 1, wherein the water-soluble monomer A1 is selected from a group consisting of hydroxyethyl acrylate, hydroxyethyl methacrylate, hydroxypropyl acrylate, hydroxypropyl methacrylate, ethoxylated-2-hydroxyethyl acrylate, ethoxylated-2-hydroxyethyl methacrylate, hydroxymethyl styrene, vinyl acetate, acrylamide, dimethyl diallyl ammonium chloride, [2-(methacryloyloxy)ethyl]trimethylammonium chloride, [2-(acryloyloxy)ethyl]trimethylammonium chloride; (3-acrylamidopropyl)trimethylammonium chloride, [3-(methacryloylamino)propyl]trimethylammonium chloride, acryloxyethyldimethylbenzyl ammonium chloride, methacryloxyethyldimethylbenzyl ammonium chloride, acrylic acid, sodium acrylate, potassium acrylate, methacrylic acid, sodium methacrylate, potassium methacrylate, 2-acrylamido-2-methylpropanesulfonic acid, 2-acrylamido-2-methylpropane sulfonate sodium salt, 2-acrylamido-2-methyl propane sulfonic acid potassium salt and any combination thereof at any weight ratio.

3. The oil-phase-free triple-play slick water concentration solution as described in claim 1, wherein the water-soluble dispersant A2 is selected from a group consisting of poly{[2-(methacryloyloxy)ethyl]trimethylammonium chloride}, poly{[2-(acryloyloxy)ethyl]trimethylammonium chloride}, poly(vinyl benzyl trimethyl ammonium chloride), poly(dimethyl diallyl ammonium chloride), hydrolyzed polyacrylamide, hydrolyzed poly(vinyl acetate) and any combination thereof at any weight ratio.

4. The oil-phase-free triple-play slick water concentration solution as described in claim 1, wherein the water-soluble free radical initiator A3 is selected from a group consisting of ammonium persulfate, sodium persulfate, potassium persulfate, hydrogen peroxide, 2,2'-azobisisobutylamidine dihydrochloride, 2,2'-azo[2-(2-imidazolin-2-yl) propane] dihydrochloride, 4,4'-azobis(4-cyanovaleric acid) and any combination thereof at any weight ratio.

5. The oil-phase-free triple-play slick water concentration solution as described in claim 1, wherein the inorganic salt A4 is selected from a group consisting of sodium chloride, ammonium chloride, ammonium bicarbonate, ammonium carbonate, ammonium sulfate, potassium chloride, sodium sulfate, aluminum tribromide, aluminum trichloride, aluminum nitrate, aluminum sulfate, potassium aluminum sulfate, ammonium chromate, ammonium chlorate, ammonium nitrate, ammonium sulfamate, ammonium sulfide, ammonium sulfite, ammonium perchlorate, barium nitrate, barium oxalate, cesium chloride, cesium chromate, calcium chloride, calcium chromate, calcium oxalate, copper nitrate, copper sulfate, ferrous chloride, ferric chloride, lithium bromide, lithium carbonate, lithium chloride, lithium hypochlorite, lithium chlorate, lithium perchlorate, lithium iodide, lithium nitrate, lithium sulfide, lithium sulfite, lithium sulfate, magnesium chloride, magnesium perchlorate, magnesium sulfate, manganese dichloride, manganese trichloride, potassium bromide, potassium bicarbonate, potassium bisulfite, potassium carbonate, potassium chlorate, potassium iodide, potassium nitrate, potassium iodate, potassium permanganate, potassium sulfate, potassium sulfite, potassium sulfide, rubidium bromide, rubidium chloride, rubidium iodide, rubidium nitrate, silver nitrate, sodium bicarbonate, sodium bisulfite, sodium borate, sodium borohydride, sodium bromide, sodium bromate, sodium carbonate, sodium chlorate, sodium chlorite, sodium sulfite, sodium hydrosulfide, sodium hypochlorite, sodium hypophosphite, sodium nitrate, sodium nitrite, sodium perchlorate, sodium periodate, sodium permanganate, sodium sulfide, strontium carbonate, strontium chloride, strontium nitrate, strontium titanate, stannous chloride, stannic chloride, vanadium chloride, zinc bromide, zinc carbonate, zinc chloride, zinc iodide, zinc sulfate, zinc sulfide and any combination thereof at any weight ratio.

6. The oil-phase-free triple-play slick water concentration solution as described in claim 1, wherein the fluorocarbon monomer B1 is selected from a group consisting of pentafluorophenyl acrylate, 1,1,1,3,3,3-hexafluoro isopropyl acrylate, 1H,1H,3H-hexafluorobutyl acrylate, 2,2,2-trifluoroethyl acrylate, perfluorodecyl acrylate and any combination thereof at any weight ratio.

7. The oil-phase-free triple-play slick water concentration solution as described in claim 1, wherein the quaternary ammonium salt B2 is selected from a group consisting of tetramethylammonium chloride, choline chloride, butyl trimethylammonium chloride, octyl trimethyl ammonium chloride, dodecyl trimethyl ammonium chloride, cetyl trimethyl ammonium chloride, poly(dimethyl diallyl ammonium chloride) and any combination thereof at any weight ratio.

8. The oil-phase-free triple-play slick water concentration solution as described in claim 1, wherein the inorganic salt B3 is selected from a group consisting of sodium chloride, ammonium chloride, ammonium bicarbonate, ammonium carbonate, ammonium sulfate, potassium chloride, sodium sulfate, aluminum tribromide, aluminum trichloride, aluminum nitrate, aluminum sulfate, potassium aluminum sulfate, ammonium chromate, ammonium chlorate, ammonium nitrate, ammonium sulfamate, ammonium sulfide, ammonium sulfite, ammonium perchlorate, barium nitrate, barium oxalate, cesium chloride, cesium chromate, calcium chloride, calcium chromate, calcium oxalate, copper nitrate, copper sulfate, ferrous chloride, ferric chloride, lithium bromide, lithium carbonate, lithium chloride, lithium hypochlorite, lithium chlorate, lithium perchlorate, lithium iodide, lithium nitrate, lithium sulfide, lithium sulfite, lithium sulfate, magnesium chloride, magnesium perchlorate, magnesium sulfate, manganese dichloride, manganese trichloride, potassium bromide, potassium bicarbonate, potassium bisulfite, potassium carbonate, potassium chlorate, potassium iodide, potassium nitrate, potassium iodate, potassium permanganate, potassium sulfate, potassium sulfite, potassium sulfide, rubidium bromide, rubidium chloride, rubidium iodide, rubidium nitrate, silver nitrate, sodium bicarbonate, sodium bisulfite, sodium borate, sodium borohydride, sodium bromide, sodium bromate, sodium carbonate, sodium chlorate, sodium chlorite, sodium sulfite, sodium hydrosulfide, sodium hypochlorite, sodium hypophosphite, sodium nitrate, sodium nitrite, sodium perchlorate, sodium periodate, sodium permanganate, sodium sulfide, strontium carbonate, strontium chloride, strontium nitrate, strontium titanate, stannous chloride, stannic chloride, vanadium chloride, zinc bromide, zinc carbonate, zinc chloride, zinc iodide, zinc sulfate, zinc sulfide and any combination thereof at any weight ratio.

9. The oil-phase-free triple-play slick water concentration solution as described in claim 1, wherein to the dispersion polymer drag reducer A, prior to the polymerization, may introduce a mutual solvent A6 and a hydrophobic monomer A7, or A mutual solvent A6 and a fluorocarbon-containing monomer A8; wherein the resultant drag reducing macromolecules, after the dispersion polymerization, is hydrophobic or fluorocarbon-modified; wherein the mutual solvent A6 is selected from a group consisting of ethylene glycol monobutyl ether, dimethyl formamide, and alcohol derivatives, aldehyde derivatives, ketone derivatives, ether derivatives and other derivatives of dimethyl sulfoxide and any combination thereof at any weight ratio; wherein the hydrophobic monomer A7 is selected from a group of hydrophobic monomers comprising methyl acrylate, methyl methacrylate, ethyl acrylate, ethyl methacrylate, propyl acrylate, propyl methacrylate, butyl acrylate, butyl methacrylate, styrene and any combination thereof at any weight ratio; wherein the fluorocarbon monomer A8 is selected from a group consisting of pentafluorophenyl acrylate, 1,1,1,3,3,3-hexafluoro isopropyl acrylate, 1H,1H,3H-hexafluorobutyl acrylate, 2,2,2-trifluoroethyl acrylate, perfluorodecyl acrylate and any combination thereof at any weight ratio.

* * * * *